United States Patent [19]
Muraishi et al.

[11] 3,811,726
[45] May 21, 1974

[54] MOVABLE SEAT FOR A MOTOR VEHICLE

[75] Inventors: Masakazu Muraishi; Noriaki Hamada; Toshiyuki Shinkawa; Tomiji Arai, all of Tokyo, Japan

[73] Assignees: Nissan Motor Company, Limited; Ikeda Bussan Company, Limited, both of Yokohama City, Japan

[22] Filed: July 3, 1972

[21] Appl. No.: 268,841

[30] Foreign Application Priority Data
Nov. 12, 1971 Japan.............................. 46-90477
July 10, 1971 Japan.............................. 46-50678
July 10, 1971 Japan.............................. 46-50676

[52] U.S. Cl. ............................................. 297/341
[51] Int. Cl. ............................................ A47c 1/02
[58] Field of Search...... 297/341, 28 L, 317 X, 329, 297/354 T; 5/4 X; 248/127 T

[56] References Cited
UNITED STATES PATENTS
| | | | |
|---|---|---|---|
| 2,189,396 | 2/1940 | Greig | 297/341 |
| 2,796,113 | 6/1957 | Lyon et al. | 297/341 |
| 2,803,290 | 8/1957 | Schamel et al. | 297/341 |
| 2,851,083 | 9/1958 | Rhodes | 297/341 |
| 2,820,506 | 1/1958 | Duluk et al. | 297/341 |
| 2,160,015 | 5/1939 | Haberstump | 297/341 |

*Primary Examiner*—Paul R. Gilliam

[57] ABSTRACT

An adjustable support structure for a seat unit of a motor vehicle, which structure permits fore and aft adjustments of the seat unit. The adjustable support structure comprises a stationary base member for fixing to a floor panel of the motor vehicle in laterally spaced and parallel relation to extend upwardly from the floor panel beneath the different seat ends in fore and aft relation thereto, a movable support member slidably carried on the stationary base member for fore and aft adjustments therealong and fixedly mounted thereon frame structures for the seat unit, a biasing means operatively interposed between the stationary base member and the movable support member for biasing the movable support member in forward direction, and a latch mechanism selectively releasable to cause the movable support member to automatically move in the forward direction under the force of the biasing means when the seat back is tilted forwardly to a predetermined angle.

6 Claims, 14 Drawing Figures

MOVABLE SEAT FOR A MOTOR VEHICLE

This invention relates to mounting means for a movable vehicle seat and, more particularly, to an adjustable support structure for a pivoted seat for a motor vehicle.

It is a principal object of the present invention to provide a novel and improved adjustable support structure for a movable seat for a motor vehicle, which structure is capable of permitting automatic forward movement of the seat with respect to its base.

It is another object of the present invention to provide an improved adjustable support structure for a movable seat of a motor vehicle, which structure is arranged to effect automatic forward movement of the seat upon tilting or pivoting movement of the seat.

It is still another object of the present invention to provide an improved adjustable support structure for a seat of a motor vehicle, which structure is adapted to effect automatic forward movement of the seat when the seat back is pivoted forwardly through an arc of a predetermined degree.

It is still another object of the present invention to provide an improved adjustable support structure for a seat of a motor vehicle, which structure provides ease of setting of the seat to its initial setting position when the seat back is pivoted back to its normal forwardly facing position.

It is a further object of the present invention to provide an improved adjustable support structure for a seat of a motor vehicle, which structure is highly reliable in operation, simple in construction and economical to manufacture.

These and other objects and advantages of the present invention will become more apparent from the following description when taken in conjunction with the accompanying drawings, in which.

Referring now to the drawings and more particularly to FIGS. 1 through 4, there is shown a preferred embodiment of an adjustable support structure according to the present invention. In the illustrated embodiment, the adjustable support structure is shown as incorporated in the structure of a seat unit 10 which is indicated in phantom lines in FIG. 4. The seat unit 10 illustrated is of a usual bracket type having a seat cushion 12 and a seat back 14, and is mounted on the adjustable support structure of the present invention so that the seat unit 10 is adjustable in fore and aft directions and the seat back 14 is tiltable forwardly to permit access to the space behind the seat.

The adjustable support structure, which is generally designated at reference numeral 16, generally comprises a pair of stationary base members 18 for fixing to a floor panel (not shown) of a motor vehicle in laterally spaced and parallel relation to extend upwardly from the floor panel beneath the different seat ends in fore and aft relation thereto, a pair of movable support members 20 slidably carried on the respective stationary base members 18 for fore and aft adjustments therealong and fixedly mounted thereon frame structures for the seat unit 10, a biasing means 22 operatively interposed between one of the stationary base members 18 and corresponding movable support member 20 for constantly biasing the movable support member in the forward direction, and a latch mechanism 24 selectively releasable to cause the movable support member 20 to automatically move in the forward direction by the force of the biasing means 22 when the seat back 14 is tilted forwardly to a predetermined angle.

Figure 1:
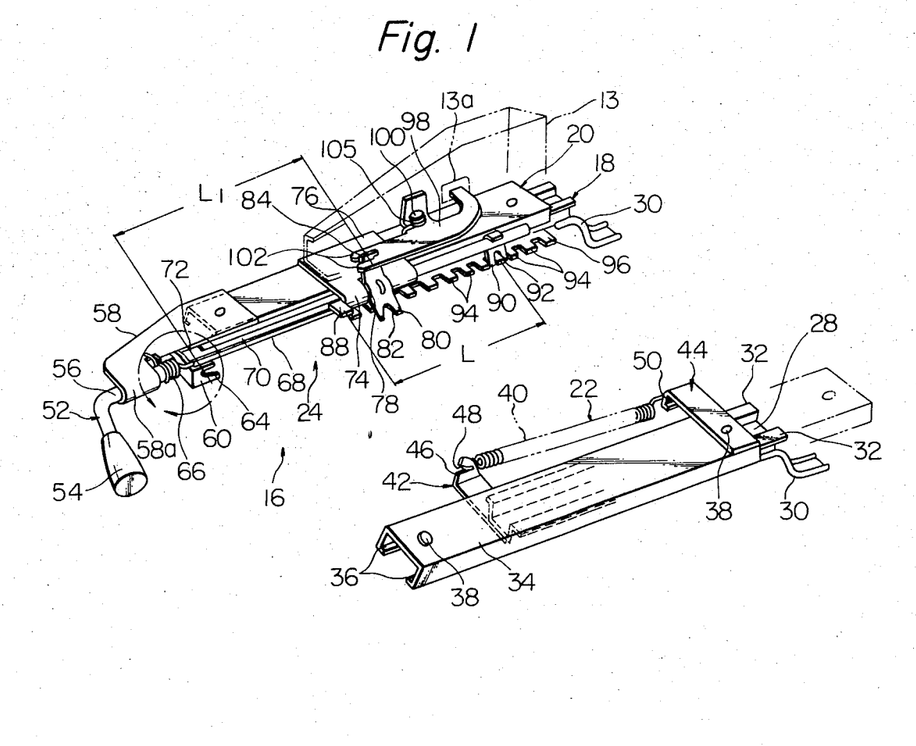
FIG. 1 is a fragmentary perspective view of a preferred embodiment of an adjustable support structure embodying the features of the present invention.
Figures 2, 3:
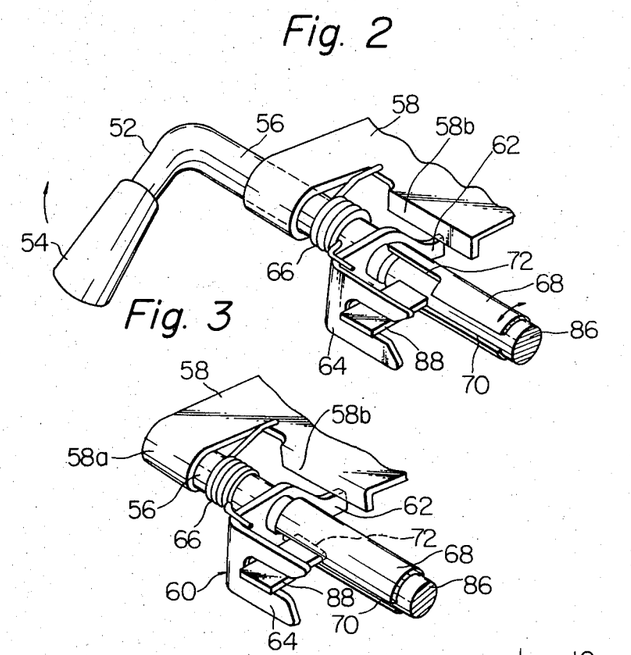
FIG. 2 is a fragmentary perspective view of a part of a latch mechanism of the embodiment shown in FIG. 1 and showing a stop member in line with an extension of a slit formed in a guide sleeve.
FIG. 3 is a view similar to FIG. 2 but shows the stop member being located in the slit formed in the guide sleeve.

The stationary base members 18 are formed in channel shape and provided with a bottom 28 fixedly secured to the floor panel (not shown) of the motor vehicle by means of a pair of mounting members 30, only one of which is shown in FIG. 1 for the sake of clarity of illustration. It should be noted that the mounting members 30 may be dispensed with, if desired. The base members 18 also have a pair of flanges 32 which extend laterally and outwardly to provide a horizontal bearing surface on which the movable support member 20 is slidably carried.

Likewise, the movable support member 20 is formed in channel shape and provided with a top portion 34 carried on the flanges 32 of the base member 18. The support member 20 also has a pair of flanges 36 which extend laterally and inwardly. A pair of bores 38 are formed in the top portion 34 of the support member 20 to provide ease of mounting of a frame structure 13 of the seat unit 10 on the support member 20.

As discussed hereinabove, the seat unit 10 thus mounted on the support member 20 is constantly biased in a forward direction by the action of the biasing means 22 which includes a spiral tension spring 40 and which is connected between the stationary base member 18 and the movable support member 20. To this end, a pair of elongated flat members 42 and 44 are provided which are welded or otherwise secured to the stationary base member 18 and the movable support member 20, respectively. The flat member 42 has an upwardly extending flange portion 46 formed with a notch 48 in which one end of the coil spring 40 is hooked, while the flat member 44 has a downwardly extending flange portion 50 to which the other end of the coil spring 40 is connected.

It should be appreciated that in the embodiment of FIG. 1, the biasing means 22 is shown as mounted on the right-hand mounting structure, but it may be alternatively mounted on the left-hand mounting structure.

As previously noted, the present invention has the advantages in that the seat unit thus mounted on the adjustable support structure of the present invention can be automatically moved in forward direction only by forwardly tilting the seat unit to a predetermined degree and that the seat unit can be moved back and set to its initial position in an easy fashion. For this purpose, the adjustable support structure of the present invention incorporates the latch mechanism 24 which is shown as mounted on the left-hand mounting structure.

The latch mechanism 24 includes a control lever 52 having a gripping handle 54 and a shaft 56. As best seen from FIGS. 2 and 3, the shaft 56 is rotatably received in a rounded portion 58a of a first bracket 58, which is connected to the forward end of the movable support member 20 by welding or any other fastener means (see FIG. 1). The first bracket 58 is formed with a flange 58b which extends longitudinally and downwardly to provide a stop means for an associated part to be described hereinafter in detail.

A fork member 60 is secured to an end portion of the shaft 56. This fork member 60 has a flange portion 62 extending perpendicularly to the shaft 56 and engaging the lower edge of the flange 58b formed in the first bracket 58. The fork member 60 also has a fork portion 64 directed toward the position shown in FIGS. 1, 2 and 3. As shown, a spiral spring 66 is mounted on the shaft 56, and has one end engaging the upper surface of the first bracket 58 and the other end engaging the upper side wall of the fork member 60 to bias the shaft 56 in counterclockwise direction.

The latch mechamism 24 also includes a guide sleeve 68 having a longitudinally extending slit 70 formed therein over its entire length and a slot 72 formed in a position adjacent the slit 70 at the leading end of the guide sleeve 68. As best shown in FIG. 1, this guide sleeve 68 is received in and supported by a rounded portion 74 formed in a second bracket 76 and is rotatable within a limited angle. The second bracket 76 is secured to an intermediate portion of the movable support member 20 by welding or any other suitable fastener means, though not shown. This bracket 76 has formed therein a recess 78 at its lateral edge portion, in which a first locking plate 80 is movably disposed. The first locking plate 80 is fixed at its intermediate portion to the other end of the guide sleeve 68, and has a downwardly extending latch slot 82 and an upwardly extending flange portion 84.

As shown, the latch mechanism 24 further includes a locking shaft 86 which is slidably disposed in the guide sleeve 68. The locking shaft 86 has a stop member 88 at its one end which stop member 88 is shown as a flat plate in the drawings. The stop member 88 is selectively received in the fork portion 64 of the fork member 60 to limit the degree of rotation of the guide sleeve 68 in a manner to be discussed in detail. A second locking plate 90 is fixedly secured to the other end portion of the locking shaft 86 and movable therewith.

The locking plate 90 has a latch slot 92 which engages a selected one of a plurality of latch lugs 94 formed in a flat plate 96. In the embodiment shown in FIG. 1, while the flat plate 96 is shown as integral with the stationary base member 18, the flat plate 96 may be formed with separate member which is welded to the bottom 28 of the base member 18 in a known manner.

It should be borne in mind that a distance L between the stop member 88 and the second locking plate 90 should be determined to be equal to a distance $L_1$ between the fork member 60 and the first locking plate 80 for the reason to be described hereinafter in detail.

Figure 4:
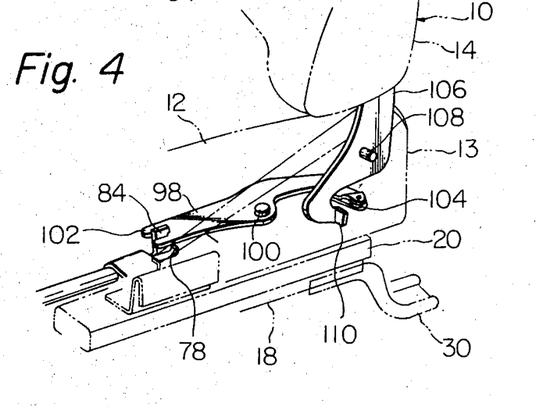
FIG. 4 is a fragmentary perspective view of another part of the latch mechanism of the embodiment shown in FIG. 1.
Figure 5:
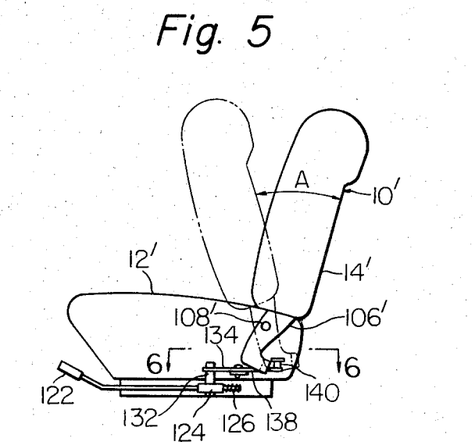
FIG. 5 is a fragmentary schematic side elevational view of a modified form of the adjustable support structure according to the present invention.
Figure 6:
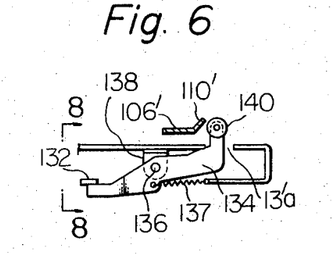
FIG. 6 is a fragmentary side elevational view of an essential part of the latch mechanism of the modified form shown in FIG. 5 and showing a latch arm disengaged from an associated release lever.
Figure 7:
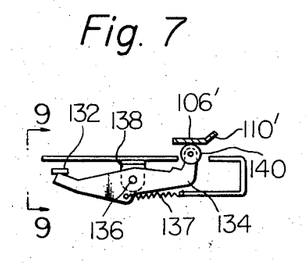
FIG. 7 is a view similar to FIG. 6 but shows the latch arm engaging the release lever.
Figure 8:
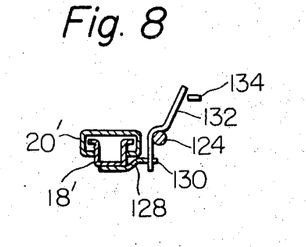
FIG. 8 is a sectional view of the latch mechanism taken on line 8 — 8 of FIG. 6.
Figure 9:
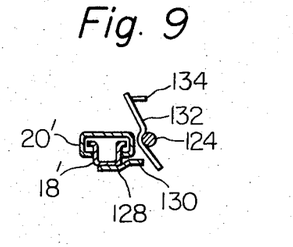
FIG. 9 is a sectional view of the latch mechanism taken on line 9 — 9 of FIG. 7.

As best shown in FIGS. 1 and 4, a latch arm 98 is provided which constitutes an important feature of the latch mechanism 24. This latch arm 98 is pivoted at its intermediate portion on a pivot pin 100 fixedly mounted on the movable support member 20. The pivot pin 100 projects upwardly from the movable support member 20. The latch arm 98 has a notched portion 102 at one end thereof in which the flange portion 84 of the first locking plate 80 is received so that the first locking plate 80 is moved to a release position to cause the latch slot 82 to disengage from one of the lugs 94 when the latch arm 98 is moved clockwise. The latch arm 98 also has a roller 104 at the other end thereof the other end extending through a transverse opening 13a of the frame structure 13. A coil spring 105 is mounted on the pivot pin 100 to constantly bias the constantly the latch arm 98 in a direction as shown by an arrow in FIG. 1, that is, in a direction to cause the latch slot 82 of the first locking plate 80 to engage one of the latch lugs 94.

As best shown in FIG. 4, an angle shaped releasing lever 106 is provided for selectively releasing the latch mechanism 24 upon forward pivotal movement of the seat back 14 thereby to effect automatic forward movement of the seat unit 10. To this end, the releasing lever 106 is pivoted at its intermediate portion on a pivot pin 108 fixedly mounted on the frame structure 13. As shown, the releasing lever 106 has one end fixedly mounted on the seat back 14 and the other end provided with a flange 110 extending outwardly therefrom. The flange 110 selectively engages the roller 104 provided on the end of the latch arm 98 when the seat back 14 is tilted forwardly.

It is to be noted that the same moment at which the engagement of the flange 110 and the roller 104 takes place can be appropriately adjusted by suitably determining the distance between the flange 110 and the roller 104. By this adjustment, the latch arm 98 is actuated by the associated release lever 106 when the seat back 14 is forwardly tilted to a predetermined angle.

Before entering into detail discussion of operation of the adjustable support structure 16 according to the present invention, let it be assumed that the seat back 14 rests in its normally forwardly facing position as seen in FIG. 4 and that the first and second lock plates 80 and 90 simultaneously engage the same selected latch lug 94 to become locked. When, now, the seat back 14 is tilted forwardly or in a counterclockwise direction through an arc of a predetermined angle, the flange 110 formed on the release lever 106 abuts the roller 104 provided on the end of the latch arm 98. As the seat back 14 is still tilted forwardly from the normally forwardly facing position, then the latch arm 98 is rotated counterclockwise against the force of the spring 105 thereby moving the first lock plate 80 in a direction to retract from the latch lug 94. Since, in this instance, the guide sleeve 68 is secured to the first lock plate 80, the guide sleeve 68 is slightly rotated from the position shown in FIG. 2 to the position shown in FIG. 3 and the stop member 88 connected to the locking shaft 86 rests in an extension of the slit 70 formed in the guide sleeve 68. Under these circumstances, the movable parts such as support member 20 together with the guide sleeve 68 are forced to move in a forward direction by the action of the spring 40 provided between the stationary base member 18 and the movable support member 20 until the edge portion of the second bracket 76 abuts the side wall of the stop member 88 (see FIG. 1). Thus, the seat unit 10 is automatically held in a forward position to permit access to the space behind the seat.

When, however, the seat unit 10 is pivoted back to its normal position, the movable parts such as supporting member 20 with the guide sleeve 68 are moved in a rearward direction. In the event that the first lock plate 80 is not aligned with the second lock plate 90, the stop member 88 remains in the slit 70 formed in the guide sleeve 68 so that the guide sleeve 68 is prevented from being rotated thereby to prevent the first lock plate 80 from engaging the latch lug 94. As the first lock plate 80 is moved to a position to align with the second lock plate 90 due to the rearward movement of the seat unit 10, then the stop member 88 is located in the slot 72 formed in the guide sleeve 68. In this condition, the guide sleeve 68 is freely rotatable within a limited angle and, therefore, the first lock plate 80 is caused to engage the same latch lug 94 with which the second lock plate 90 also engages. Accordingly, the adjustable support structure 16 is held in a locked condition. Thus, the seat unit 10 is automatically moved to and locked in its initially set position without requiring any difficult steps.

It will be understood that the fore and aft adjustments of the seat unit 10 with respect to the stationary base member 18 can be achieved by moving the gripping handle 54 of the control lever 52 counterclockwise or in a direction shown by an arrow in FIG. 1 against the force of the spring 66. With the gripping handle 54 being moved in this direction, the fork member 60 connected to the shaft 56 causes the stop member 88 and accordingly the control shaft 86 and the guide sleeve 68 to simultaneously rotate counterclockwise. Consequently, the first lock plate 80 secured to the guide sleeve 68 and the second lock plate 90 fixed to the control shaft 86 are released from the associated latch lug 94 so that the movable support member 20 is freely movable between fore and aft positions. Thus, the seat unit 10 is readily set in a suitable position and locked in this position by releasing the gripping handle 54.

A modified form of the adjustable support structure according to the present invention is schematically shown in FIGS. 5 through 9, wherein like component parts are designated by the same reference numerals as used in FIGS. 1 through 4 with the exception that a prime (') has been added to the respective numerals. It is to be noted that the biasing means for biasing the movable support structure 20' in forward direction is not shown in this modified form for the sake of simplicity of illustration. Moreover, it will be appreciated that this modified form of the adjustable support structure has no provision for effecting automatic setting of the seat unit 10' to its initial position.

In the modification shown in FIGS. 5 through 9, the latch mechanism, generally indicated at 120, includes a control lever 122 which is connected to a shaft 124. The shaft 124 is rotatably mounted on the frame structure 13' of the seat unit 10' and is biased in a clockwise direction as viewed in FIG. 5 by means of a spiral spring 126 which is mounted on an extension (not identified) of the control lever 122. The latch mechanism 120 also includes a plate member 128 welded to the bottom 28' of the stationary base member 18' and having one or more notches 130 formed at its lateral edge portion. An angle shaped or bent locking plate 132 is secured at its intermediate portion to the shaft 124 for pivotal movement. This locking plate 132 has a lower portion selectively engaging a selected notch 130 and an upper portion associated with a latch arm 134. The latch arm 134 is pivoted at its intermediate portion on a pivot pin 136 which is fastened to a flange 138 transversely extending from the frame structure (not identified) of the seat unit 10'. The latch arm 134 is biased in counterclockwise direction as viewed in FIGS. 6 and 7, that is, in a direction to cause the locking plate 132 to engage the notch 130 by means of tension spring 137. This latch arm 134 has one end engaging the upper portion of the locking plate 132 and the other end provided with a roller 140 which selectively abuts the flange portion 110' of the release lever 106', the other end extending through the transverse opening 13'a formed in the frame structure 13'.

When, in operation, the seat back 14' is forwardly pivoted through an arc of a predetermined angle A from the normal forwardly facing position, the flange portion 110' of the release lever 106' engages the roller 140. Consequently, the latch arm 134 is rotated clockwise against the force of the spring 137 and assumes the position shown in FIG. 7. In this instance, the locking plate 132 is rotated counterclockwise so that the lower portion thereof disengages from the notch 130 formed in the plate member (see FIG. 9). Thus, the seat unit 10' is automatically moved in a forward direction by the action of the spring means (not shown).

When, however, the seat back 14' is moved back to its initial position, the flange portion 110' of the release lever 106' disengages from the roller 140 so that the latch arm 134 is rotated counterclockwise. In this instance, the locking plate 132 is rotated clockwise so that the lower portion thereof engages the notch 130. Thus, the seat unit 10' is held in a locked condition.

Another modified form of the adjustable support structure according to the present invention is illustrated in FIGS. 10 through 14, wherein like component parts are designated by the same numerals as used in FIGS. 1 through 4 with the exception that a double prime ('') has been added to the respective numerals. In this modification, the movable support members 20'' are shown as formed integral with the frame structures 13'' for the seat unit 10''. The latch mechanism 150 includes a latch arm 152 pivoted at its intermediate portion on a pivot pin 154 mounted on a support 156. The support 156 is secured to and extends from a vertical surface (not identified) of the frame structure 13''.

Figure 10:
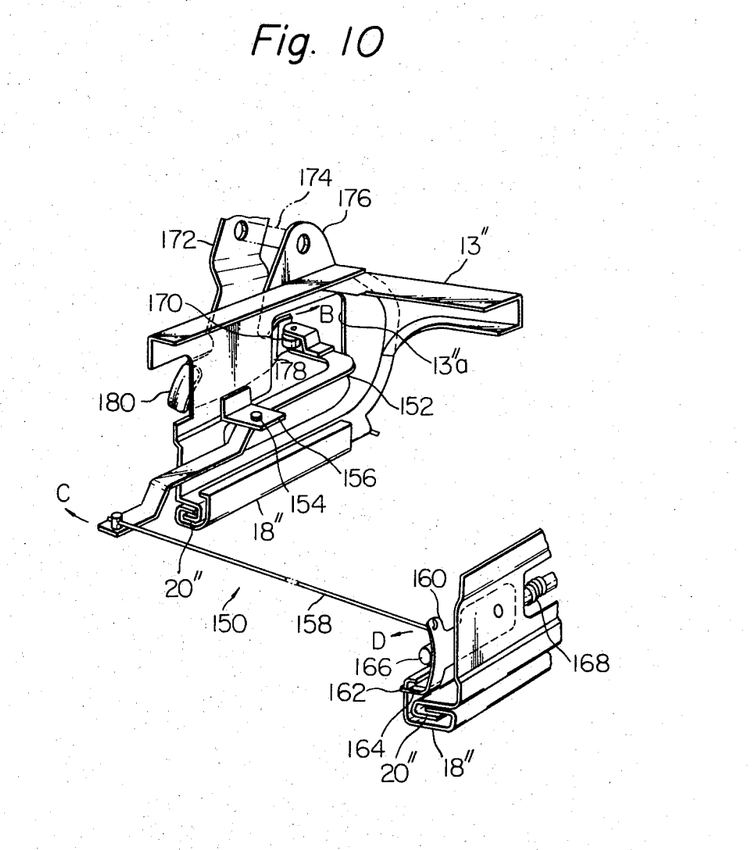
FIG. 10 is a fragmentary perspective view of another modified form of the adjustable support structure according to the present invention.

The latch arm 152 has one end connected to a release linkage 158, to which a lock plate 160 is operatively connected. The lock plate 160 is secured at one end to the vertical wall portion of the right-hand frame structure 13″ and has a flange portion 162 engaging one of a plurality of slots 164 formed in a vertical wall portion of the stationary base member 18″. As seen in FIG. 10, the lock plate 160 is fixed to a release shaft 166 so that the lock plate 160 can be pivoted on the shaft 166. A spiral spring 168 is mounted on the release shaft 166 and is connected to the frame structure 13″ for biasing the locking plate 160 in clockwise direction or in a direction to cause the flange portion 162 to engage the slot 164.

The latch arm 152 also has the other end provided with a roller 170, the other end extending through the transverse opening 13″a. In order to actuate this latch arm 152 upon tilting movement of the seat unit 10″, a release lever 172 is connected to the seat back 14″ and is pivoted on a pivot pin 174 mounted on an extension 176 of the frame structure 13″. As best seen from FIG. 11, the release lever 172 has first and second ears 178 and 180 formed at the lower portion thereof, the first ear 178 selectively engaging the roller 170 while the second ear 180 selectively engages a roller 182. The roller 182 is mounted on a shaft 184 laterally projecting from a bracket 186 which is fastened to the floor panel (not identified) of the motor vehicle. The second ear 180 and the roller 182 have a function of a biasing means for biasing the movable support member 20″ in its forward direction.

Figure 11:
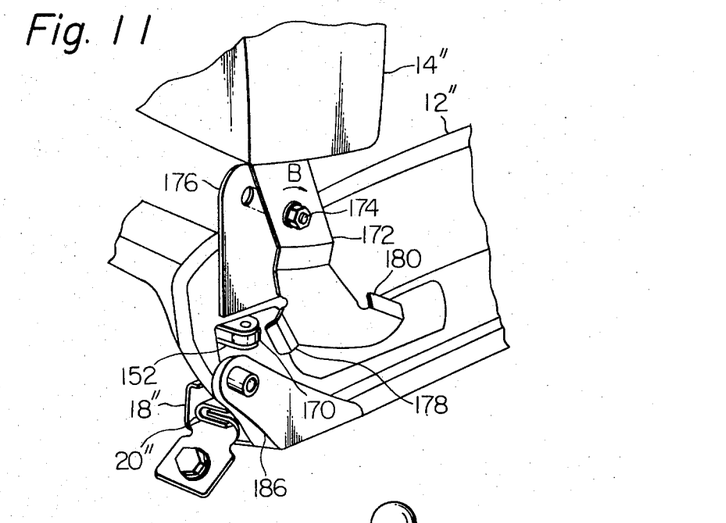
FIG. 11 is a fragmentary perspective elevational view of a part of the latch mechanism of the modified form shown in FIG. 10.
Figure 12:
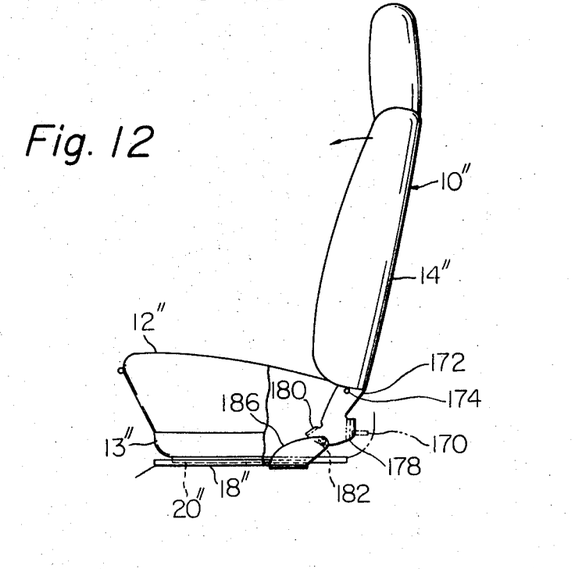
FIG. 12 through 14 are views illustrating operating characteristics of the adjustable support structure shown in FIG. 10.
Figure 13:
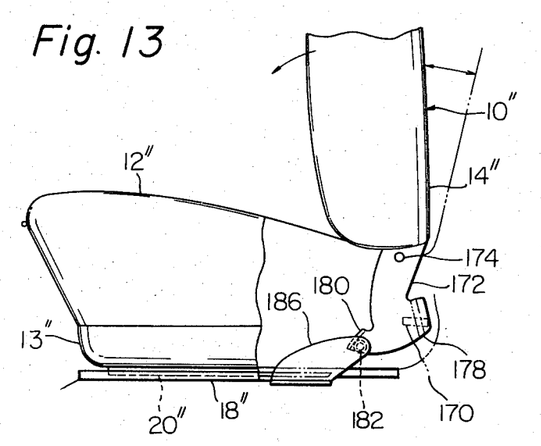
Figure 14:
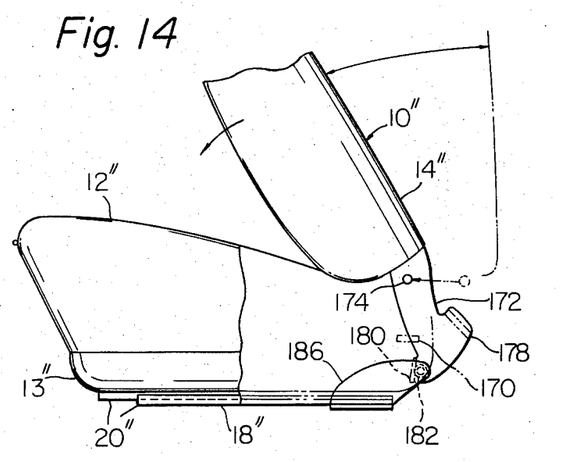

When, now, the seat back 14″ is forwardly tilted from the position shown in FIG. 12 to the position shown in FIG. 13, the release lever 172 is caused to rotate in a direction shown by an arrow B in FIG. 11. In this instance, the first ear 178 formed in the release lever 172 engages the roller 170 so that the latch arm 152 rotates clockwise or in a direction shown by an arrow C in FIG. 10. Consequently, the locking plate 160 is rotated counterclockwise or in a direction shown by an arrow D in FIG. 10, so that the flange portion 162 disengages from the slot 164 to provide free fore and aft movements to the movable support member 20″.

When, in this instance, the seat back 14″ is still tilted forwardly, the second ear 180 formed on the release lever 172 is brought into engagement with the roller 182 mounted on the bracket 186. By this engagement of the second ear 180 with the roller 182, the frame structure 13″ and the seat unit 10″ are moved in the forward direction from the initial position shown by a phantom line in FIG. 14 to the position indicated by a solid line in FIG. 14.

When, however, the seat back 14″ is tilted back to its normal forwardly facing position, the first ear 178 disengages from the roller 170 while the second ear 180 disengages from the roller 182. In this condition, there is no force exerted on the latch lever 152 for rotating the lever 152 in the direction shown by the arrow C and, therefore, the flange portion 162 of the locking plate 160 is brought into engagement with the slot 164 because of the action of the spring 168 for thereby locking the movable support member 20″ with respect to the stationary base member 18″.

What is claimed is:

1. A seat structure for a vehicle comprising, in combination, a seat having a back pivoted thereto for forward tilting movement from an upright position relative to said seat, a pair of laterally spaced stationary base members extending under said seat, a pair of movable support members slidably carried on said stationary base members, respectively, and supporting thereon said seat, a laterally extending plate secured to one of said base members and provided with a plurality of lugs along its side edge, a bracket fixedly connected to one of said movable support members at an intermediate portion thereof and having at its lateral edge a rounded portion provided with a recess, a guide sleeve rotatably supported by said rounded portion of said bracket and extending parallel to a side surface of said one of said movable support members, said guide sleeve having a longitudinally extending slit along its entire length and having a slot at one end and on one side of said slit, a locking shaft rotatably received in said guide sleeve, a control lever for rotating said locking shaft, a first locking plate rotatably accommodated in said recess and secured to said guide sleeve a predetermined distance from said slot of said guide sleeve, a second locking plate secured to said locking shaft at one end thereof and selectively engageable with one of said lugs, a stop member secured to said locking shaft at the other end thereof within said predetermined distance from said second locking plate, said stop member being slidably received in said slot of said guide sleeve, means connected to said control lever and receiving said stop member when said seat is in its rest position and, when said slot of said guide sleeve is aligned with said stop member, to cause said guide sleeve to rotate in a direction to cause said first and second locking plates to simultaneously engage with said one of said lugs, and means for releasing said first locking plate to allow said seat to move forward when said seat back is tilted forward.

2. A seat structure according to claim 1, further comprising biasing means mounted between the other one of said stationary base members and the other one of said movable support members for biasing said other one of said movable support members in a forward direction.

3. A seat structure according to claim 1, in which said means connected to said control lever comprises a fork member rotatable with said control lever, said fork member receiving said stop member when said seat is held in its rest position and when said slot of said guide sleeve is aligned with said stop member.

4. A seat structure according to claim 1, wherein said releasing means comprises a latch arm pivoted at its intermediate portion on said one of said movable support members and having at its one end formed with a fork portion to receive one end of said first locking plate, said latch arm being pivotable in a direction to release said first locking plate when said seat is tilted forward.

5. A seat structure for a vehicle comprising, in combination, a seat having a back pivoted thereto for forward tilting movement from an upright position relative to said seat, a pair of laterally spaced stationary base members extending under said seat, a pair of movable support members slidably carried on said stationary base members, respectively, and carrying thereon said seat, a laterally extending plate member secured to one of said base members and provided with a plurality of notches formed at its lateral edge, a rotatable shaft mounted on a frame structure of said seat, a control lever connected to said rotatable shaft for rotatable movement therewith, an angle shaped locking plate secured at its intermediate portion to said rotatable shaft and having one end engageable with one of said notches of said plate member, means for releasing said angle shaped locking plate when said seat is tilted forward, and means for biasing said movable support members in a forward direction whereby when said angle shaped locking plate is released by said releasing means, said seat is moved forward, wherein said releasing means comprises a latch arm pivoted at its intermediate portion on a pivot pin which is fastened to a flange extending from the frame structure of said seat, said latch arm having one end engageable with the other end of said angle shaped locking plate when said seat it tilted forward, and spring means connected to said latch arm for biasing the same in a direction to cause the one end thereof to disengage with the other end of said angle shaped locking plate.

6. A seat structure for a vehicle comprising, in combination, a seat having a back pivoted thereto for forward tilting movement from an upright position relative to said seat, a pair of laterally spaced stationary base members extending under said seat, one of said stationary base members having a vertically extending wall portion formed with a plurality of slots, a pair of movable support members slidably carried on said stationary base members, respectively, a frame structure integrally formed with said movable support members and carrying thereon said seat, a lock plate secured at its one end on a wall portion of said frame structure and having a flange portion engaging one of said slots of said one of said stationary base members, a latch arm pivoted at its intermediate portion on a flange laterally extending from said frame structure, a release linkage connected between one end of said latch arm and an upper portion of said lock plate, and a release lever connected to said back and pivoted on a pivot pin mounted on an extension of said frame structure, said release lever having first and second ears engageable with the other end of said latch arm and a roller mounted on a shaft laterally projecting from a bracket fastened to a floor panel of said vehicle, and said second ear and said roller serving as biasing means for biasing said movable support members in its forward direction when said seat is tilted forward, wherein said first ear of said release lever is arranged to engage with the other one end of said latch arm when said seat is tilted to a predetermined angle while said second ear is arranged to engage with said roller when said seat is tilted to another predetermined angle.

* * * * *